April 16, 1963  D. S. MACK  3,085,472
MAGNIFYING MAKE-UP GLASSES WITH PIVOTALLY MOUNTED LENSES
Filed March 20, 1961
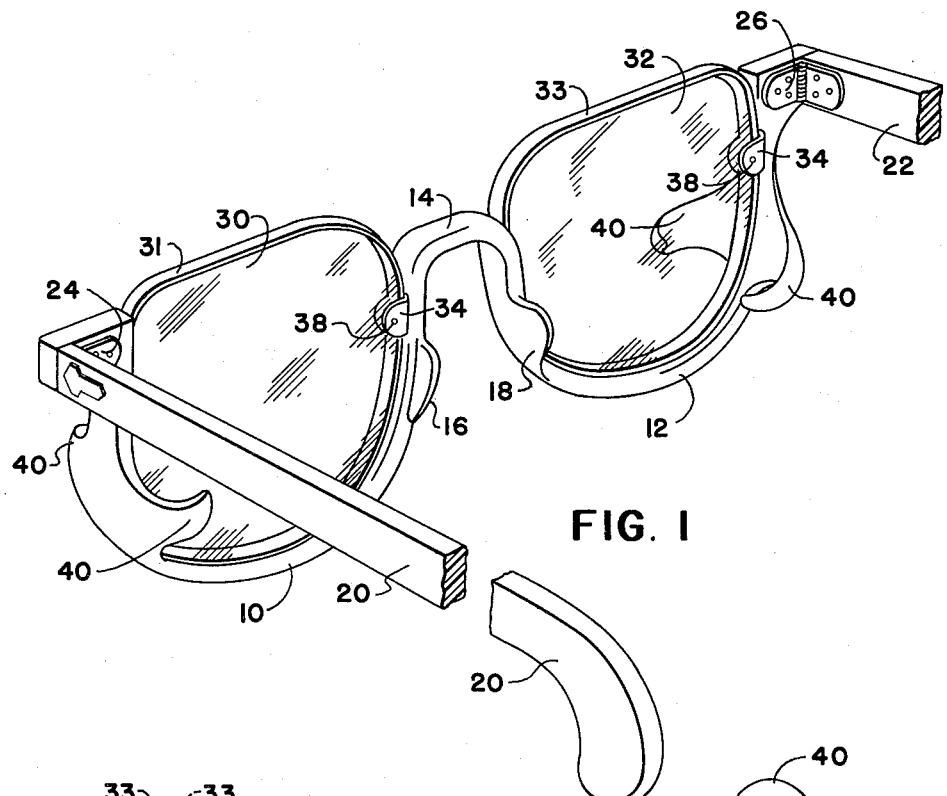
FIG. 1
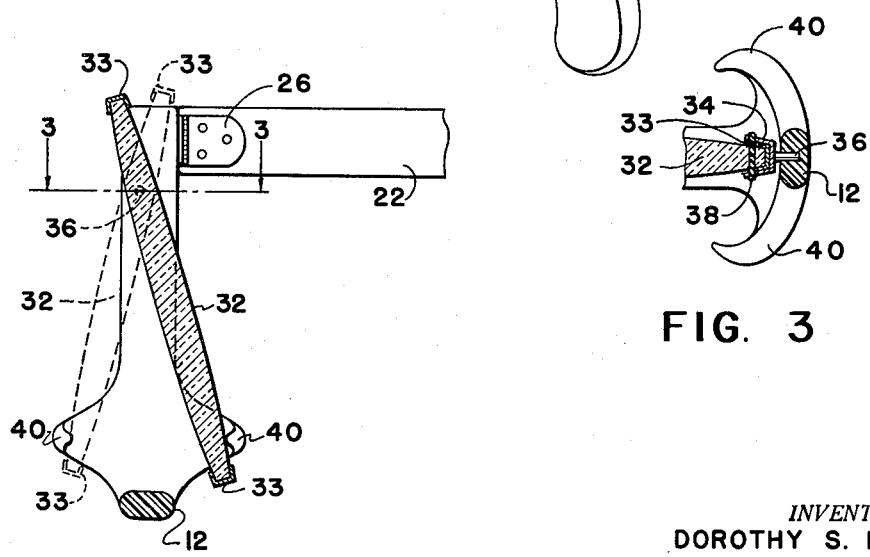
FIG. 2
FIG. 3
INVENTOR.
DOROTHY S. MACK
BY
*John H. Widdowson*
ATTORNEY

United States Patent Office 3,085,472
Patented Apr. 16, 1963

3,085,472
MAGNIFYING MAKE-UP GLASSES WITH PIVOT-ALLY MOUNTED LENSES
Dorothy S. Mack, 801 S. Oliver, Wichita, Kans.
Filed Mar. 20, 1961, Ser. No. 96,783
2 Claims. (Cl. 88—41)

This invention relates to eye glasses and more particularly to glasses particularly constructed and adapted to be used for applying make-up and the like. Still more particularly, the invention relates to the construction of glasses wherein magnifying lenses are provided so that make-up, particularly eye make-up and the like, can be applied with relative ease and great accuracy. In a still further aspect, the invention relates to glasses means particularly constructed and adapted to set the lens portions thereof away from the eyes of the user so that eye make-up and the like can be easily applied.

Various types of eye glasses and the like are known to the prior art. These primarily include common reading glasses or the like wherein the lenses are rigidly mounted in the frame and where such lenses are ground to a doctor's prescription to improve defective eye sight. Also, various types of lens systems particularly constructed with multiple or magnifying lenses for laboratory use and the like are known to the prior art. The prior art devices are intended for use by a wearer with the lens portion thereof located relatively closely to the eyes of the user and the lenses are normally rigidly mounted in place so that correct vision is obtained under all circumstances.

In accordance with the present invention, new glasses means are provided which are particularly constructed and adapted for use by the wearer during the application of make-up or the like. Frame means are provided which have lens means mounted therein and which are constructed to be positioned on the face of the user. The lens means are constructed and positionable relative to the face of the user to permit the user to observe various portions of the face during the application of make-up or the like.

In a preferred specific embodiment of the invention, the frame means include lens receiving portions and nose pieces therewith to position the lens or frame means on the nose of the wearer. The frame means have temples hingedly mounted in one end portion on the frame means and engageable in the other end portion with the face of the wearer to position the glasses. Lens means are provided which are desirably magnifying type lenses and which are mounted in the lens receiving portions of the frames. The lenses are preferably pivotally mounted at the side portions thereof so that the top and bottom portions of the lenses can be moved outwardly and inwardly relatively to the frames to adjust the lenses so that various portions of the face can be viewed by the wearer during the application of make-up or the like. Stop means are desirably provided to the front and rear of the lens means to limit movement of the lens means and such stop means can be constructed to accurately position the lens means at the desired position for applying make-up to the eye brows, eye lashes, etc.

Accordingly, it is an object of the invention to provide new eye glasses means.

Another object of the invention is to provide new eye glasses having magnifying type lens means therein which are particularly constructed and adapted for use when applying eye make-up and the like.

A further object of the invention is to provide new eye glasses having frame means therewith which are constructed to position the lens portion thereof from the eyes of the user a greater than normal distance.

A still further object of the invention is to provide magnifying make-up glasses having movable lenses therewith.

Another object of the invention is to provide new magnifying make-up glasses having pivotally mounted lenses and stop means therewith to position same.

Another object of the invention is to provide relatively inexpensive make-up glasses particularly constructed for use when applying make-up or the like.

Various other objects, advantages and features of the invention will become apparent to those skilled in the art from the following description taken in connection with the accompanying drawings, in which:

FIG. 1 is partial isometric view of a preferred specific embodiment of the magnifying make-up glasses of the invention.

FIG. 2 is a partial cross sectional view through one of the lens of the make-up glasses shown in FIG. 1.

FIG. 3 is a partial cross sectional view taken along the line 3—3 of FIG. 2.

The following is a discussion and description of a preferred specific embodiment of the new magnifying make-up glasses of the invention, such being made with reference to the drawings whereon the same reference numerals are used to indicate the same or similar parts and/or structure. It is to be understood that such discussion and description is not to unduly limit the scope of the invention.

Referring now to the drawings in detail, the eye glasses of the invention includes frame means which are preferably formed of plastic material and which include lens receiving portions 10 and 12 which are preferably of like construction and the mirror image of each other. The lens receiving portions 10 and 12 are shown as being semi-circular in configuration however other shapes can be used, if desired. A bridge portion 14 is provided and can be integrally formed when the lens receiving portions are made of plastic. Bridge 14 joins the lens receiving portion 12 and 10. Nose pieces 16 and 18 are also provided and can be integrally formed with the frame means or separately constructed, as desired. Preferably, the nose pieces 16 and 18 are integrally formed and project from the lens receiving portions 10 and 12 of the frame means as best shown in FIG. 1. The nose pieces 16 and 18 can be of any suitable construction and are formed in the inner end portions to be comfortably engaged by and fitted on the nose of the wearer. Preferably, the nose pieces 16 and 18 are relatively long as shown in FIG. 1 of the drawings so that the frame means are spaced a greater than normal distance from the face of the user.

Two temples 20 and 22 are provided and are hingedly secured in one end portion to opposite end portions of the lens receiving portions 10 and 12 of the frame means by hinge means 24 and 26, respectively. The other end portions of the temples 20 and 22 are suitably shaped to engage the wearer and the temples 20 and 22 are preferably relatively long so that the eye glasses are positioned a greater than normal distance from the eyes of the wearer.

Two lenses 30 and 32 are provided and are mounted in the lens receiving portions 10 and 12 of the frame means. Preferably, lenses 30 and 32 are of a magnifying type lens and can be formed of glass, suitable plastics, etc. The lenses 30 and 32 are preferably covered by protective bands 31 and 33, respectively, to prevent sharp edges of the lenses from cutting the wearer.

The lenses 30 and 32 are preferably pivotally mounted in the lens receiving portions 10 and 12. The preferred manner of doing this is best seen in FIG. 1 and FIG. 3 of the drawings and includes providing generally U-shaped clamps 34 which are secured to opposite side portions of each of the lenses. Clamps 34 are provided with a pivot or shank portion 36 which projects from the side of the lenses when the clamps are mounted thereon and which is mountable or positionable within the lens receiving portions 10 and 12 of the frame means. This relatively simple means for mounting the lenses 30 and 32 permits the lens to be pivoted about the pivot or shank portion 36 of the clamp means 34 and easily moved as illustrated in FIG. 2 of the drawings. The clamps 34 can tightly engage the sides of the lenses 30 and 32 to grip same or a suitable mounting pin 38 can pass through the lens and the side portions of the clamp member 34.

Means are preferably provided to limit the movement of the lenses 30 and 32 within the frame means. The preferred manner of accomplishing this is illustrated in the drawings and includes arcuate stops 40 which extend outwardly and inwardly to the front and rear of the frame means and are desirably positioned beneath the pivotal mounting of the lenses 30 and 32 on the frame means. In the preferred embodiment the stop means 40 are integrally formed with the plastic lens receiving portions 10 and 12. If desired, the stop means can be separately formed and secured thereto in any suitable manner or, the stop means can be positioned above the pivot or at the top or bottom of the lenses. The stop means prevent the pivoted lenses from moving far enough to the rear to engage the face or eyes of the user and thus eliminates any possibility of injury to the wearer. Also, the stops can serve to accurately locate the lenses at desired locations.

In use, the wearer positions the glasses on the face in the usual manner and the relatively long nose pieces 16 and 18 and the temples 20 and 22 will locate the lenses 30 and 32 a distance from the eyes which is greater than normally obtained by the usual vision correcting eye glasses. This spacing permits the pivotal movement of the lenses 30 and 32 without danger of injury to the eyes or face and such is not detrimental in view of the fact that the lenses 30 and 32 are normally magnifying type lenses. With the make-up glasses thus on the face the lenses 30 and 32 are then adjusted so that the portion of the face to which the make-up is being applied will be magnified to permit relatively accurate application of the make-up, etc., to the user. For example, with the lenses in the position shown in the solid lines in FIG. 2, mascara, eye shadow and eye liner can easily be applied. With the lenses in the position shown in the dotted lines in FIG. 2 the eye brows can be arched and eye pencil applied. These two positions are normally all that is necessary for eye make-up to be applied and the stop means 40 can be located so that each lens is moved to the extreme positions as illustrated in FIG. 2 during these operations, making other adjustment of the lenses between the stops 40 unnecessary.

The magnifying make-up glasses of the invention are very desirable for all who apply eye make-up, etc., since they permit the user to obtain relatively accurate application of same and eliminates eye strain often encountered. Furthermore, the magnifying make-up glasses will be particularly advantageous for use with those persons who have defective vision since the relatively close work required by modern day make-up applications, etc., is often almost impossible since the user must wear common vision correcting lenses in order to see well enough for the relatively fine work involved and then these lenses are located so as to impair the work being done. The magnifying make-up glasses can be relatively inexpensively made since the frame means are preferably integrally molded plastic members or separate members which are common in the eye glass art. The lens members can be made of inexpensive glass, plastic, or the like. While the lenses will normally be the same for each pair of glasses regardless of the vision of the user, they can be constructed particularly for the individual user.

While the invention has been described in connection with a preferred specific embodiment thereof, it will be understood by those skilled in the art that such is intended to illustrate and not to limit the scope of the invention, which is defined by the claims.

I claim:

1. Magnifying make-up glasses comprising, in combination, a plastic lens frame having two semi-circular lens receiving portions joined by an integral connecting bridge portion, two nose pieces projecting from and integral with said lens receiving portions to position said glasses on the nose of the wearer, two temples hingedly secured in one end portion to opposite ends of said lens frame and formed in the other end portion to engage the wearer and retain said glasses in position, two magnifying lenses, each of said lenses having two U-shaped clamps secured to opposite sides thereof, each of said clamps having a shank portion projecting from the side of said lenses when mounted, said lens receiving portions of said frame being constructed to receive said shank portion of said clamps to thereby pivotally mount said lenses in said frame, said lens frame having arcuate stops projecting outwardly and inwardly to the front and rear of said frame at each end thereof and positioned beneath the pivotal mounting of said lenses in said frame to limit movement of said lenses, said nose piece and said temples being of size to space said lenses a greater than normal distance from the eyes of the user so that said lenses can be pivotally moved within the limits defined by said stops to magnify a mirror image of the eyes, eye lashes and eye brows of the wearer during the application of make-up.

2. Magnifying make-up glasses comprising, in combination, a lens frame having lens receiving portions joined by a connecting bridge portion, said frame having nose pieces and temples constructed to space said lens receiving portions a greater than normal distance from the face of the wearer, two magnifying lenses, said lenses being pivotally mounted in said lens receiving portions of said frame so that the top and bottom portions thereof can be moved toward and away from the face of the wearer, stop means with said lens frame having portions projecting outwardly and inwardly to the front and rear of said frame at each end thereof and positioned beneath the pivotal mounting of said lenses in said frame to limit movement of the upper and lower portions of said lenses in said frame, said glasses being constructed and adapted so that the wearer can adjust said lenses to magnify the eyes and adjacent portions of the face during the application of make-up thereto.

References Cited in the file of this patent

UNITED STATES PATENTS

| | | |
|---|---|---|
| 1,085,522 | Baker | Jan. 27, 1914 |
| 2,825,266 | Kleinman | Mar. 4, 1958 |

FOREIGN PATENTS

| | | |
|---|---|---|
| 16,123 | Great Britain | 1895 |